Feb. 13, 1923. 1,445,590
A. W. HOUCK.
CUTTING APPARATUS.
FILED OCT. 14, 1922.
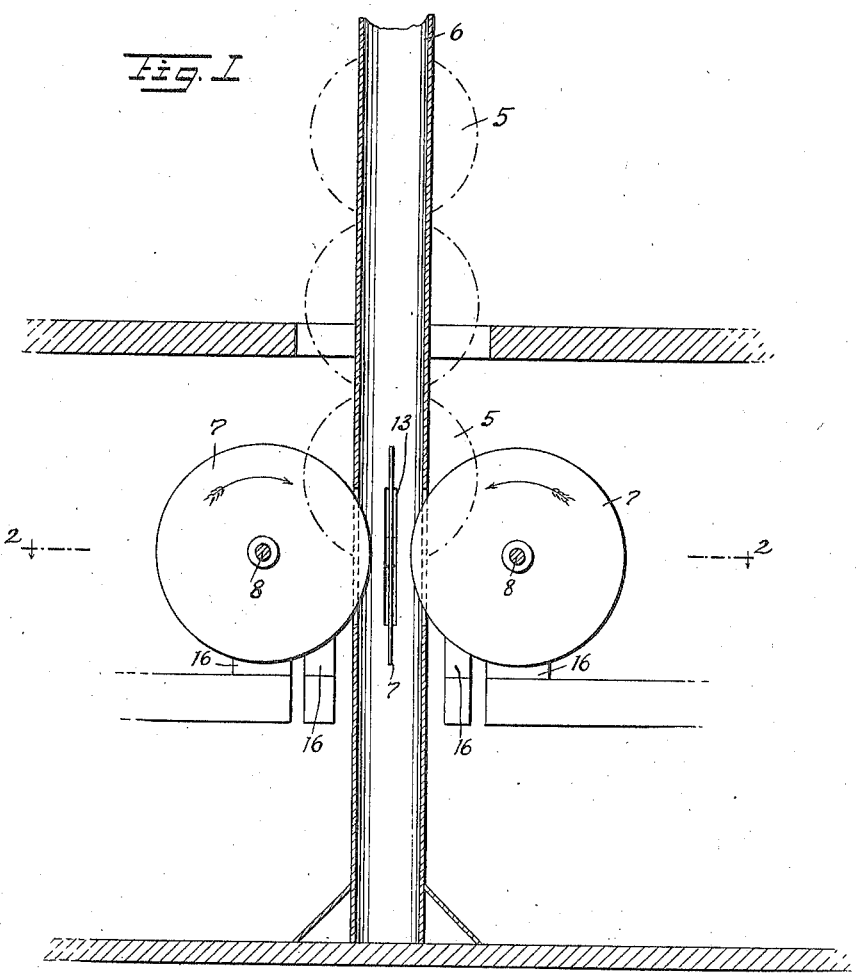
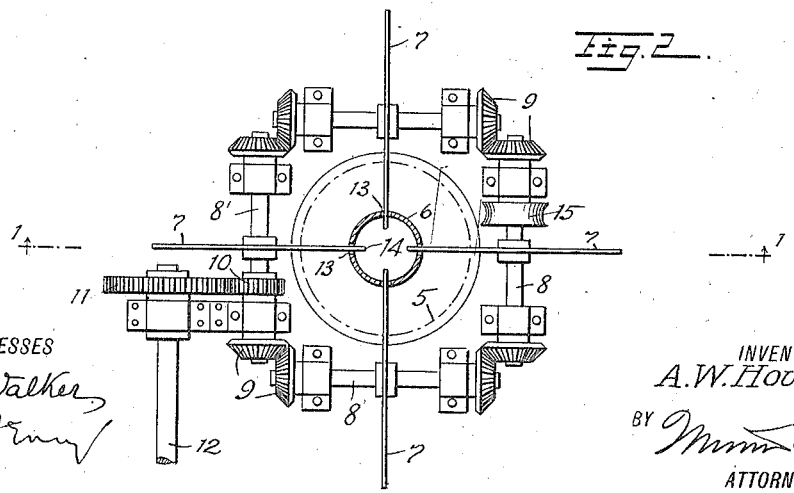
WITNESSES
H. T. Walker
INVENTOR
A. W. Houck
BY
ATTORNEYS Patented Feb. 13, 1923.

1,445,590

UNITED STATES PATENT OFFICE.

ARLINGTON W. HOUCK, OF VEGA BAJA, PORTO RICO.

CUTTING APPARATUS.

Application filed October 14, 1922. Serial No. 594,643.

*To all whom it may concern:*

Be it known that I, ARLINGTON W. HOUCK, a citizen of the United States, and a resident of Vega Baja, Porto Rico, have invented a new and Improved Cutting Apparatus, of which the following is a full, clear, and exact description.

The invention relates broadly to cutting apparatus, and aims to provide an apparatus adapted particularly for sub-dividing a generally spherical object into fifths, quarters, thirds, or other fractions, but not necessarily into equal parts.

The special use in mind in providing the new apparatus is in the canning industry, where spherical edible objects, such as fruit and the larger vegetables, must be cut up, either before or after the peeling operation, and either before or after the coring operation, if the latter is required, in order to obtain parts small enough to be properly packed in the commercial sizes of cans, jars or the like.

One of the objects of the present invention is to provide an exceedingly simple, inexpensive, expeditious and reliable apparatus of the kind indicated and wherein the edible object is preferably passed through cutting means adapted to make all the required subdivisions simultaneously.

Another object is to provide an apparatus of the kind just described, and in which the cutting instrumentalities are so grouped and shaped that very simple feeding means, constituting another feature of the invention, may be efficiently combined therewith, particularly for employment in the case of previously cored spherical objects, such feeding means having the advantages not only of accurately guiding a succession of the objects through the cutting means; but of permitting additional objects to be easily, quickly and continuously added to the line of objects retained and guided by the feeding means, and of permitting convenient and automatic discharge of the severed parts of such objects.

Another object is to provide such an apparatus and one wherein the cutting means includes a plurality of continuously operating separate cutting members, working in angularly related planes, but having fields of cutting operation surrounding the feeding means in a common zone, or at a common level where the feeding means is provided, in agreement with present preference, to retain and guide the line of spherical objects to descend toward and through such field by gravity; whereby, as is desirable, but a single power means may be provided, and that the single power means preferably provided for operating all the cutting members simultaneously.

The foregoing and other objects of the invention will be more clearly understood from the following description, when taken in connection with the accompanying drawing, showing an embodiment of the invention as at present preferred; it being understood, of course, that such embodiment is merely illustrative and that the scope of protection contemplated is defined by the appended claims.

In said drawing, in which like reference characters refer to like parts;

Fig. 1 is a vertical axial section, taken on the line 1—1 of Fig. 2; and

Fig. 2 is a horizontal section taken on the line 2—2 of Fig. 1, but with certain of the parts shown in plan.

Before describing the exceedingly simply machine disclosed in the drawing, it should be distinctly understood, as already indicated, that the generally spherical objects need not necessarily be products of the vegetable world; nor need they necessarily be substantially generally spherical in the sense that a grape fruit is almost a true sphere. However, for convenience of description in the following part of this specification, the spherical objects 5, shown in dot-and-dash lines, will be referred to as grape fruit.

Each grape fruit 5, whether or not previously peeled, although it is preferable to peel them first, are cored by any suitable means before subjection to the operation of the present cutting apparatus; at least in any such apparatus where feeding means, therefor is embodied as a single guiding member, such as is comprised in the present case by the central vertically disposed tubular member 6, which, of course, is the case where the cutting apparatus is constructed, as here, to serve as an illustrative example of a particular embodiment designed for use in cutting cored grape fruit.

The cutting means includes here four-disk knives 7 arranged for rotation in vertical planes each spaced from another 90° around tubular member 6. Although as indicated above any number of knives 7 or their equivalents may be employed, to agree with the number of pieces into which the grape fruit is desired to be subdivided, four such knives is a very practical arrangement not only for cutting the grape fruit into subdivisions which are alike and of a size convenient for canning, but also for permitting very simple means to be provided whereby the cutting knives are supported at what may be termed a common level, and for simultaneous operation relative to each grape fruit as it passes through the zone of cutting operations. Such a means includes a horizontal shaft 8 for each knife blade and between each pair of converging shafts a pair of bevel gears 9, one fixed on the end of one shaft of said pair, and one fixed on the other shaft of said pair. With these gears mitre gears as is preferable, it will be seen that upon rotating any one of the shafts 8, all the shafts are simultaneously rotated and, the cutting knives being of the same diameter, all the cutting instrumentalities have the same peripheral speed.

Very simple means for driving a selected one of shafts 8, say the shaft 8', includes a spur pinion 10 fast on said shaft 8', and a spur gear 11 meshing with said pinion and fixed on an auxiliary shaft 12 which may be driven from any suitable source of power. Or any one of the four shafts may be provided with a pulley as indicated at 15 to be driven directly from such source. Supports for the shaft bearings may be provided as indicated at 16 in Fig. 1.

In order that each grape fruit 5 as it passes through the field of cutting operations may be broken up into a plurality of completely severed subdivisions, the tubular member 6 constituting the guiding means is provided with a plurality of longitudinal slots as indicated at 13, and the radius of each disk knife is greater than the horizontal distance between the center of the knife and the center of the tubular member 6, whereby, as illustrated in the drawing, a portion 14 of each whirling knife is always protruded within one of the slots 13.

Various changes, in addition to those already noted, may, of course, be made in the general form and arrangement of the parts described or mentioned without departing from the invention, and hence I do not limit myself to the precise details set forth, but consider myself at liberty to make such changes and alterations as fairly fall within the spirit and scope of the following claims.

I claim:

1. A cutting machine for generally spherical objects including a tubular member, said member having a plurality of longitudinal slots, and a plurality of cutting disks mounted for rotation in planes including said slots, said disks always intersecting said slots and said member for guiding a series of such objects when previously cored and sleeved on said member for movement along the length thereof.

2. The cutting machine defined in claim 1, wherein said tubular member is inclined to the horizontal to permit gravity to feed the cored objects toward and past said slots.

3. A cutting machine for generally spherical objects including a plurality of movable cutting blades mounted for movement to perform cutting operations along converging lines, means for operating such blades simultaneously, and means for retaining and guiding a succession of objects through all such lines including an elongated guiding structure along which a plurality of such objects, when previously cored, may be strung for passage along the length of said structure, said structure comprising a substantially vertical tubular member, said tubular member having slots through which said cutting blades move during their cutting operations.

4. The cutting machine defined in claim 3, wherein said retaining and guiding means is an elongated guiding structure along which a plurality of such objects, when previously cored, may be strung for passage along the length of said structure, said structure comprising a substantially vertical tubular member, said tubular member having slots through which said cutting blades move during their cutting operations, said slots being arranged longitudinally on the tubular member and being spaced around the same at the same level.

5. A quartering machine for cored grape fruit including an upright guiding member on which a cored grape fruit may be mounted as a sleeving collar, and four circular cutting disks arranged in vertical planes and spaced apart 90°, the guiding member having cut-away portions into which the discs are partially received during rotation.

ARLINGTON W. HOUCK.